United States Patent
Charzinski et al.

(10) Patent No.: US 6,491,307 B1
(45) Date of Patent: Dec. 10, 2002

(54) GROUND CLEARANCE-REGULATED, AIR-SUSPENDED AXLE AGGREGATE, FOR EXAMPLE FOR MONOSPACE PRIVATE CARS

(75) Inventors: Uwe Charzinski, Fellbach (DE); Jochen Horwath, Unterensingen (DE); Hartwig Mueller, Stuttgart (DE); Gerald Ricklefs, Kernen (DE); Friedrich Scheurer, Ostfildern (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/214,344

(22) PCT Filed: Jul. 2, 1997

(86) PCT No.: PCT/EP97/03483

§ 371 (c)(1),
(2), (4) Date: Aug. 3, 1999

(87) PCT Pub. No.: WO98/02321

PCT Pub. Date: Jan. 22, 1998

(30) Foreign Application Priority Data

Jul. 11, 1996 (DE) ............................ 196 27 894

(51) Int. Cl.⁷ .............................................. B60G 17/01
(52) U.S. Cl. .................................. 280/5.508; 280/5.506
(58) Field of Search ........................... 280/5.506, 5.508, 280/6.15, 9.153, 124.157

(56) References Cited

U.S. PATENT DOCUMENTS

| | | | | |
|---|---|---|---|---|
| 3,572,747 A | * | 3/1971 | Pollinger | 280/112 |
| 3,573,884 A | * | 4/1971 | Pollinger | 280/124 |
| 3,836,161 A | * | 9/1974 | Buhl | 280/6 H |
| 4,573,702 A | * | 3/1986 | Klem | 280/6.15 |
| 4,640,526 A | * | 2/1987 | Tanaka et al. | 280/707 |
| 4,815,751 A | * | 3/1989 | Tuczek | 280/840 |
| 4,829,436 A | * | 5/1989 | Kowalik et al. | 364/424.05 |
| 4,846,496 A | * | 7/1989 | Tanaka et al. | 280/689 |
| 4,852,906 A | * | 8/1989 | Buma et al. | 280/707 |
| 4,927,170 A | * | 5/1990 | Wada | 280/707 |
| 5,046,754 A | | 9/1991 | Kimura et al. | 280/707 |
| 5,066,041 A | * | 11/1991 | Kindermann et al. | 280/772 |
| 5,130,927 A | | 7/1992 | Kunishima et al. | 364/424.05 |
| RE34,628 E | * | 6/1994 | Fujishiro et al. | 280/707 |

FOREIGN PATENT DOCUMENTS

| | | |
|---|---|---|
| DE | 3212433 | 11/1984 |
| DE | 3644492 | 7/1987 |
| EP | 0 398 158 | 11/1990 |

* cited by examiner

Primary Examiner—Eric Culbreth
Assistant Examiner—L. Lum
(74) Attorney, Agent, or Firm—Crowell & Moring LLP

(57) ABSTRACT

An axle assembly with level control, in particular with a pneumatic suspension. Changes in level which may, if appropriate, become necessary on both vehicle sides take place incrementally and with continuous alternation between the vehicle sides, i.e. the left-hand and right-hand vehicle sides are alternately raised or lowered.

13 Claims, 3 Drawing Sheets

GROUND CLEARANCE-REGULATED, AIR-SUSPENDED AXLE AGGREGATE, FOR EXAMPLE FOR MONOSPACE PRIVATE CARS

BACKGROUND AND SUMMARY OF THE INVENTION

The invention relates to an axle assembly with level control and pneumatic suspension for a vehicle, in particular a non-trackbound vehicle such as a large-capacity passenger car, having controllable pneumatic-suspension assemblies, for example pneumatic-suspension bellows, which are separate for each vehicle side and which can be connected separately to a compressor and/or to an outlet to the atmosphere via a control valve arrangement, and having sensors, which are separate for each vehicle side, for sensing the level of a vehicle body and/or for sensing a distance between a vehicle body-end part and a wheel carrier of the axle assembly.

In contemporary vehicles with pneumatic suspension, a compressed air accumulator is normally provided, which accumulator is continuously kept at a charging pressure above the operating pressure in the pneumatic-suspension assemblies by means of a compressor. In the case of a raising of the level of the vehicle body on both sides, which may possibly become necessary, the pneumatic-suspension assemblies of both vehicle sides are firstly connected to the pressure accumulator. As soon as the desired level is then at least approximately reached on one vehicle side, the connection between the pneumatic-suspension assembly of this vehicle side and the pressure accumulator is interrupted, while the pneumatic-suspension assembly on the other vehicle side continues to be connected to the pressure accumulator until the desired level is also at least approximately reached there. In this way, a vehicle can, even in the case of unequal loading of the vehicle sides, be placed with its transverse axis parallel to the carriageway or the underlying surface. The differences in loading between the vehicle sides are compensated by appropriate pressure differences between the pneumatic-suspension assemblies.

In the case of a lowering of the level on both sides, which may possibly become necessary, the pneumatic-suspension assemblies of both vehicle sides can firstly be simultaneously vented by means of outlet valves which are assigned separately to each pneumatic-suspension assembly, until the desired level is at least approximately reached on one side. Subsequently, only the pneumatic-suspension assembly on the vehicle side with excessively high pressure is then vented further.

DE 36 44 942 C2 discloses a hydropneumatic suspension system for vehicles in which parts of the vehicle can be lowered or raised even outside the control range of a level control system. So that only a comparatively small degree of expenditure on control is necessary in the case of such extreme lifting or lowering movements of the vehicle body, this publication provides for simultaneous operation of the supporting assemblies which are involved in the lifting or lowering movement to be achieved by virtue of the fact that these supporting assemblies are each briefly individually activated in succession in a predefined sequence, i.e. additional hydraulic medium is briefly fed to the hydraulic cylinder of the respective hydropneumatic supporting assembly when the vehicle of the vehicle parts is to be raised. If a lowering movement has to be carried out, hydraulic medium is briefly removed from the hydraulic cylinders of the supporting assemblies in succession. Here, the fact that the compressibility of hydraulic media is extraordinarily low is exploited. Therefore, if hydraulic medium is briefly fed to the hydraulic cylinders of the hydropneumatic supporting assemblies in succession or hydraulic medium is briefly drawn off from the hydraulic cylinders in succession, it is possible, by means of a simple measurement of time or quantity, to ensure that, averaged over time, all the hydraulic cylinders carry out the same vertical adjustment and a tilting movement of the vehicle in the course of the lifting or lowering movement is avoided.

The object of the invention is to reduce as far as possible the expenditure on open-loop or closed-loop control in a pneumatic-suspension system and at the same time permit a high level of comfort.

For this purpose, there is provision according to the invention that a change in level on both sides takes place incrementally and with continuous alternation between the vehicle sides in that, when the level is being raised on both sides, a closed-loop or open-loop control unit which is assigned to the control valve arrangement directly connects the pneumatic-suspension assembly of the one vehicle side and the pneumatic-suspension assembly of the other vehicle side to the compressor in an alternating fashion in order to carry out successive small or limited lifting movements, and, when the level is being lowered on both sides, it connects them to the atmosphere in an alternating fashion in order to carry out successive small or limited lowering movements, in which case, during the respective lifting or lowering movement at the respectively active pneumatic-suspension assembly, a level is set which is higher or lower, by a specific amount, than the level at the corresponding pneumatic-suspension assembly on the respective other vehicle side.

The invention is based on the general idea of normally avoiding a simultaneous adjustment of the pneumatic-suspension assemblies on both vehicle sides of an axle and of carrying out changes in level in each case incrementally and with continuous alternation between the vehicle sides. As a result, when there are large differences in loading between the vehicle sides and corresponding differences between the supporting forces and/or the pneumatic forces of the suspension assemblies, a load equalization or pressure equalization between the assemblies and a pronounced rolling movement of the vehicle body relative to the longitudinal axis of the vehicle, which said equalization may possibly entail, are avoided. At the same time, the open-loop or closed-loop control of the level is simplified because the aforesaid differences cannot exert any appreciable influences on the movements of the vehicle body when the level is raised or lowered.

Moreover, with pneumatic suspension systems it is possible to ensure a particularly simple design without a pneumatic pressure accumulator.

The lifting and the lowering movements which take place alternately in terms of the vehicle sides cannot be differentiated by the vehicle occupants given appropriately small lifting or lowering increments, i.e. it is assumed that the vehicle is being raised or lowered on both vehicle sides uniformly. This effect is due to the fact that feeding compressed air into a pneumatic-suspension assembly, or venting a pneumatic-suspension assembly, on one vehicle side leads in each case to corresponding changes in level on both vehicle sides because the tendency of a vehicle to roll is typically limited by at least one stabilizer between vehicle wheels or carriers on different vehicle sides.

Furthermore, in a dual-axle or multi-axle vehicle, the support of the vehicle body on the other axle or axles counteracts a rolling movement. This effect is particularly pronounced if the wheel carriers of the axle assembly are connected to one another via a rigid axle or a coupling which is similar to a rigid axle. This is because in this case a change in level which occurs in the same direction on both sides when a pneumatic-suspension assembly is being adjusted is also effectively supported by virtue of the fact that the pneumatic-suspension assemblies are normally arranged offset to a greater or lesser extent towards the longitudinal centre of the vehicle in the transverse direction of the vehicle in relation to the wheel carriers of the axle assembly.

If, according to one preferred embodiment of the invention, a relatively large offset is provided, the alternating actuation of the pneumatic-suspension assemblies on the two vehicle sides is perceptible to a particularly small degree.

In an advantageous refinement of the invention, the sensors which serve only for sensing the level are assigned signal filters at the output end, which pass on long-term average values of the sensor signals during travelling mode and pass on short-term average values of the sensor signals or unfiltered sensor signals to the closed-loop or open-loop control unit when the vehicle is stationary. This allows for the fact that oscillation movements which occur during travelling mode are normally not associated with an enduring change in level, and changes in level cannot occur, or can only occur owing to leaks in the pneumatic system, and can thus occur comparatively slowly. In contrast, when the vehicle is stationary it is necessary to allow for loading and unloading of the vehicle or for persons getting in or getting out, and correspondingly for severe changes in loading.

Moreover, it is advantageously possible to make provision for level changes which are controlled as a function of displacement to be performed when the vehicle is stationary and for predominantly time-controlled level changes to be performed when the vehicle is travelling. For this purpose, when a change in level is necessary during travelling mode, a pneumatic-suspension assembly can in each case be connected to the compressor or to the outlet for a predefined time period of, for example, five seconds, and then shut off from the compressor and the outlet for a predefined longer time period which is matched to the formation of average values over time by the signal filter. In contrast, when the vehicle is stationary, a change in level occurs which is controlled solely as a function of the sensor signals.

Other objects, advantages and novel features of the present invention will become apparent from the following detailed description of the invention when considered in conjunction with the accompanying drawings.

DETAILED DESCRIPTION OF THE DRAWING

Figure 1:
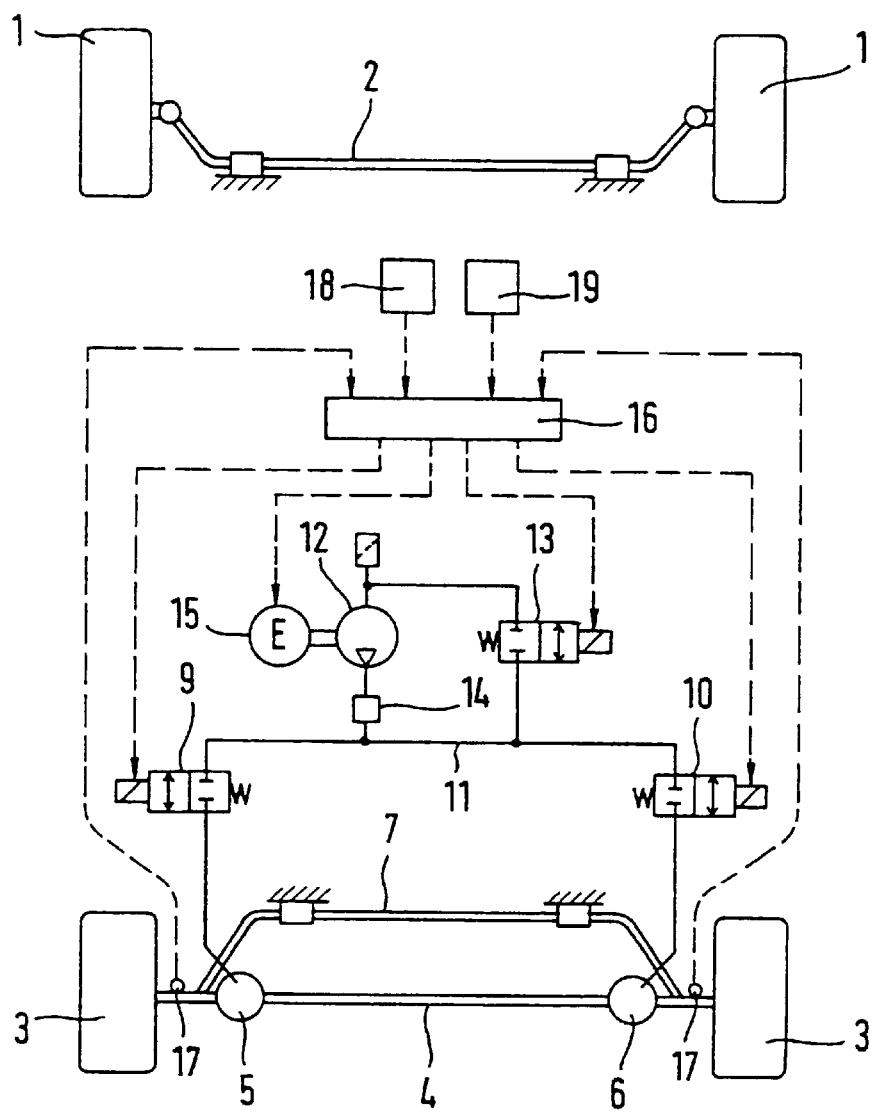
FIG. 1 shows a schematic plan view of a motor vehicle having a rear axle assembly with pneumatic suspension, according to the invention.

The motor vehicle which is otherwise not illustrated in more detail has, according to FIG. 1, a front axle with driven front wheels 1 (vehicle engine and drive shafts not illustrated), which are coupled to one another in a basically known fashion by means of a stabilizer 2 in order to avoid rolling movements of the vehicle body, in particular during cornering. The suspension of the front wheels 1 is provided by means of passive suspension assemblies (not illustrated), for example those with helical springs or torsion bar springs.

In addition, the vehicle which is illustrated by way of example has a rear axle assembly with non-driven rear wheels 3 which are arranged on a rigid axle 4 and are supported in a sprung fashion by means of basically known pneumatic-suspension assemblies 5 and 6 which are arranged between the vehicle body and/or body-end parts of the rear axle assembly and the rigid axle 4. Furthermore, in order to avoid the tendency of the vehicle body to roll, the rear wheels 3 are coupled to one another by means of a further stabilizer 7. The rigid axle 4 is merely exemplary. The invention is in no way restricted to specific axle designs. Accordingly, the vehicle could also have a rear axle assembly with individual wheel suspension, for example on semi-trailing arms.

Figure 2:
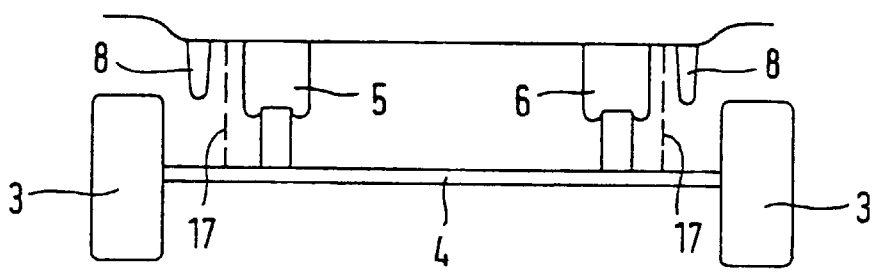
FIG. 2 shows a schematic view of the axle assembly in the longitudinal direction of the vehicle.

Arranged next to or in the pneumatic-suspension assemblies 5 and 6, which may be designed in the usual way as pneumatic-suspension bellows, are elastic stops 8 which are illustrated only in FIG. 2 and which are composed, for example, of rubber or of some other elastomer material and start to exert their supporting effect if strong spring-compression vertical movements of the axle 4 occur or the vertical distance between the axle 4 and the vehicle body is severely reduced for other reasons.

The pneumatic-suspension assemblies 5 and 6 are connected, in each case via a normally closed shut-off valve 9 or 10, to a connecting line 11 which is itself connected to the pressure side of a compressor 12 and to a normally closed shut-off valve 13. The shut-off valve 13 is arranged parallel to the compressor 12 in the manner of a bypass valve. In order to keep the pneumatic-suspension system free of condensed water, an air dryer 14 is provided which may be arranged on the pressure side of the compressor 12. On the suction side of the compressor 12 it is possible to arrange a suction filter.

The electromagnetic actuator elements which are used to activate the valves 9, 10 and 13 and an electric motor 15 which is used to drive the compressor 12 are switched on and off by means of an electronic open-loop and closed-loop control unit 16 which is connected on the input side to displacement sensors 17 which are arranged between the axle 4 and the vehicle body or parts on the vehicle body end and are used to sense the distances between the axle 4 and the vehicle body or parts on the vehicle body end.

Moreover, the open-loop or closed-loop control unit 16 is connected on the input side to a signal transmitter 18, for example a tachometer, whose signals make it possible to determine whether the vehicle is stationary or is travelling. By means of setpoint value signal transmitters 19 which can be activated manually and which are arranged at the driver's position and/or on a vehicle door, in particular on a rear door or rear flap, the open-loop or closed-loop control unit 16 receives prescribed values for the vehicle body level which is to be respectively set at the rear wheels 3, i.e. for the distances between the axle 4 and vehicle body. If the setpoint value signal transmitters 19 are not present or do not generate any signals, the open-loop or closed-loop control unit 16 attempts in each case to set the levels which have been prescribed permanently or as a function of parameters, appropriate sensors (not illustrated) being connected to associated inputs of the open-loop or closed-loop control unit 16 in order to sense the parameters which are to be respectively taken into account.

Various methods of operation of the level control on the rear wheels 3 will now be explained with reference to the other figures.

Figure 3A:
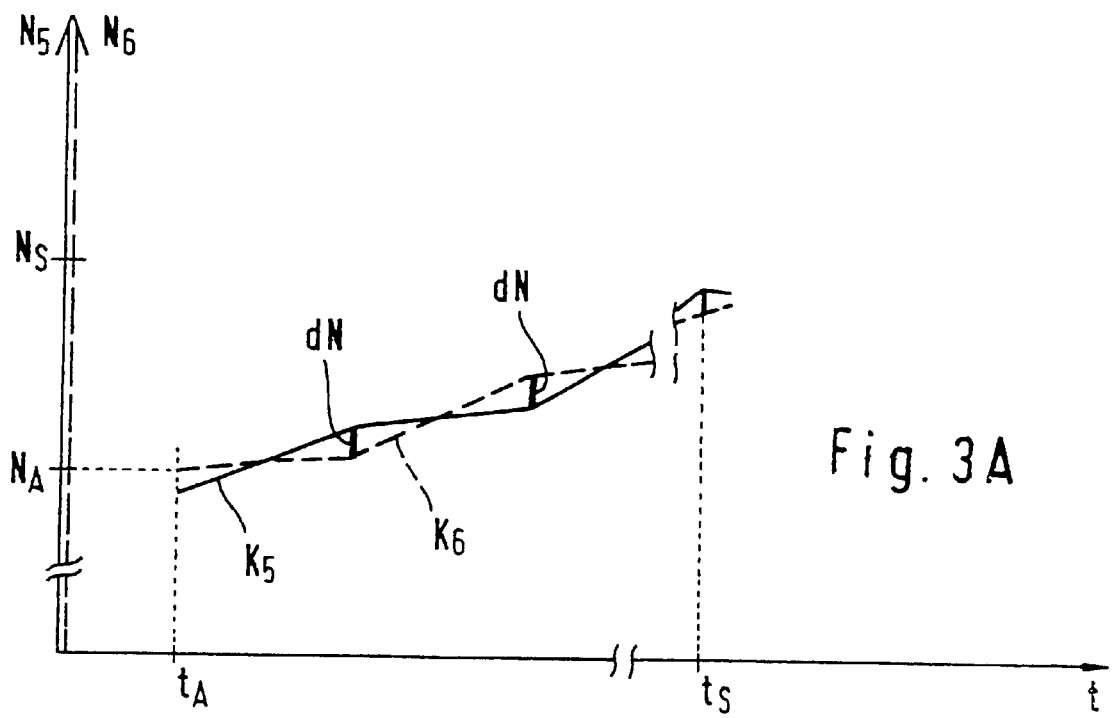
FIGS. 3A–3C show different diagrams to explain the control of a raising of the level.
Figure 3B:
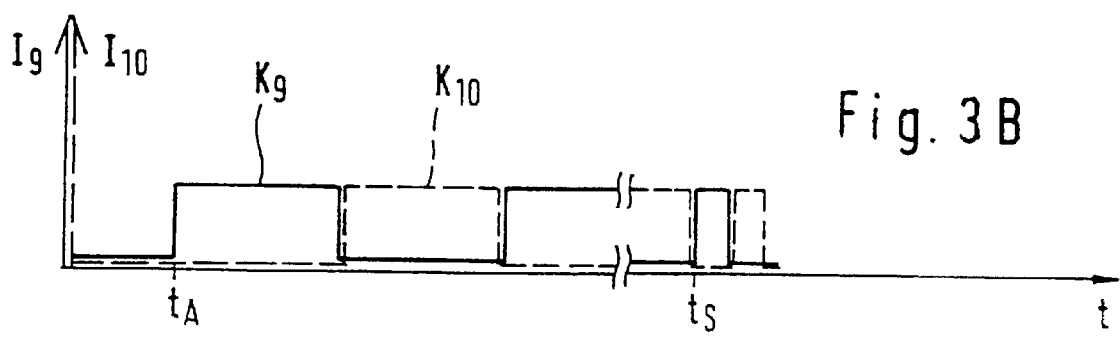
Figure 3C:
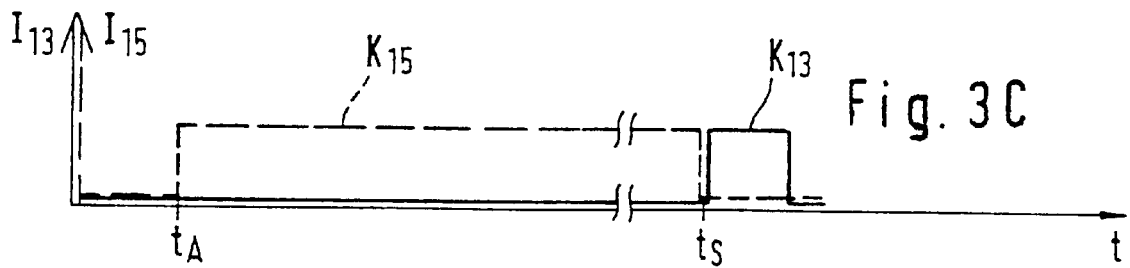

FIGS. 3A–3C relate to the case in which a raising of the level has to be performed when the vehicle is stationary because, for example, the setpoint value signal transmitter 19 (cf.

FIG. 1) has been activated and prescribes an increased setpoint level.

FIG. 3A shows the levels $N_5$ and $N_6$ of the vehicle body at the pneumatic-suspension assemblies 5 and 6 as a function of the time t, the curve $K_5$ representing the change in level at the pneumatic-suspension assembly 5 and the curve $K_6$ representing the change in level at the pneumatic-suspension assembly 6. FIG. 3B represents the electrical currents $I_9$ and $I_{10}$, which are fed to the actuator magnets of the shut-off valves 9 and 10, as a function of the time t, the curve $K_9$ showing the energization at the valve 9 and the curve $K_{10}$ showing the energization at the valve 10. In FIG. 3C, the curve $K_{15}$ shows the variation over time of the electrical current $I_{15}$ for the electric motor 15 of the compressor 12. The curve $K_{13}$ shows the variation over time of the electrical current $I_{13}$ for the actuator magnets of the valve 13.

It will now be assumed that at a time $t_A$ a level $N_S$ which lies above the level $N_A$ present at the time $t_A$ is prescribed on the higher vehicle side or on both vehicle sides for the stationary vehicle.

The consequence of this is that at the time $t_A$ the electric motor 15 is switched on and the valve 9 is opened by energizing an actuator magnet. As a result, additional air is fed into the pneumatic-suspension assembly 5 on one vehicle side, or the lower vehicle side, with the consequence that the level $N_5$ rises at the pneumatic-suspension assembly 5 in accordance with the curve $K_5$. Simultaneously, the level $N_6$ at the pneumatic-suspension assembly 6 also rises—if only to a lesser degree—because the stabilizers 2 and 7 (cf. FIG. 1) counteract a change in level of the vehicle body which is only on one side and the lifting movement of the pneumatic-suspension assembly 5, caused by the supply of air, also leads to a more or less pronounced relief of the pneumatic-suspension assembly 6 owing to the supporting of the vehicle body on the suspension elements which are assigned to the front wheels 1.

As soon as the level $N_5$ lies above the level $N_6$ by a predefined, small value $d_N$, the current $I_9$ for the actuator magnets of the shut-off valve 9 is switched off so that the valve 9 closes. At the same time, the actuator magnet of the shut-off valve 10 is energized so that the shut-off valve 10 opens. Accordingly, the compressor 12 which is driven by the electric motor 15 which continues to be energized supplies compressed air to the pneumatic-suspension assembly 6 with the consequence that the level $N_6$ rises relatively strongly and the level $N_5$ rises relatively weakly. As soon as the level $N_6$ has increased beyond the level $N_5$ by the small value dN, the shut-off valve 10 is closed, while the shut-off valve 9 is opened again.

By alternately supplying air to the pneumatic-suspension assemblies 9 and 10, the vehicle body is thus raised.

If the levels $N_5$ and $N_6$ reach the setpoint value $N_S$ at a time $t_S$, the current $I_{15}$ for the electric motor 15 is switched off, i.e. the compressor 12 is deactivated. At the same time, the actuator magnet of the shut-off valve 13 is supplied with a current $I_{13}$ in order to open this valve. Furthermore, in order to open the shut-off valves 9 and 10, their actuator magnets are briefly energized in such a way that the pneumatic-suspension assemblies 5 and 6 are each connected to the atmosphere for a very brief time period. As a result, it is possible to ensure that the level $N_S$ which is reached cannot be appreciably exceeded. This is because without this brief opening of the valves 9 and 10 a so-called "subsequent creepage" may occur after the lifting process has ended, i.e. despite the termination of the air supply to the pneumatic-suspension assemblies 5 and 6 the level which has been reached may increase further. The reasons for this are dynamic effects and thermodynamic processes in the airlines and pneumatic-suspension assemblies as well as hysteresis effects on bearing parts. Moreover, in most pneumatic-suspension assemblies the effective cross section does not remain constant during changes in level, i.e. the effective cross section normally becomes larger as the level increases. The previously mentioned "subsequent creepage" can also be caused by this.

If the levels $N_5$ and $N_6$ are unequal initially, when the raising of the level starts, compressed air is firstly fed to the pneumatic-suspension assembly 5 or 6 with the lower level until the levels $N_5$ and $N_6$ are approximated. Then, the lifting operation which has been explained above takes place.

Figure 4A:
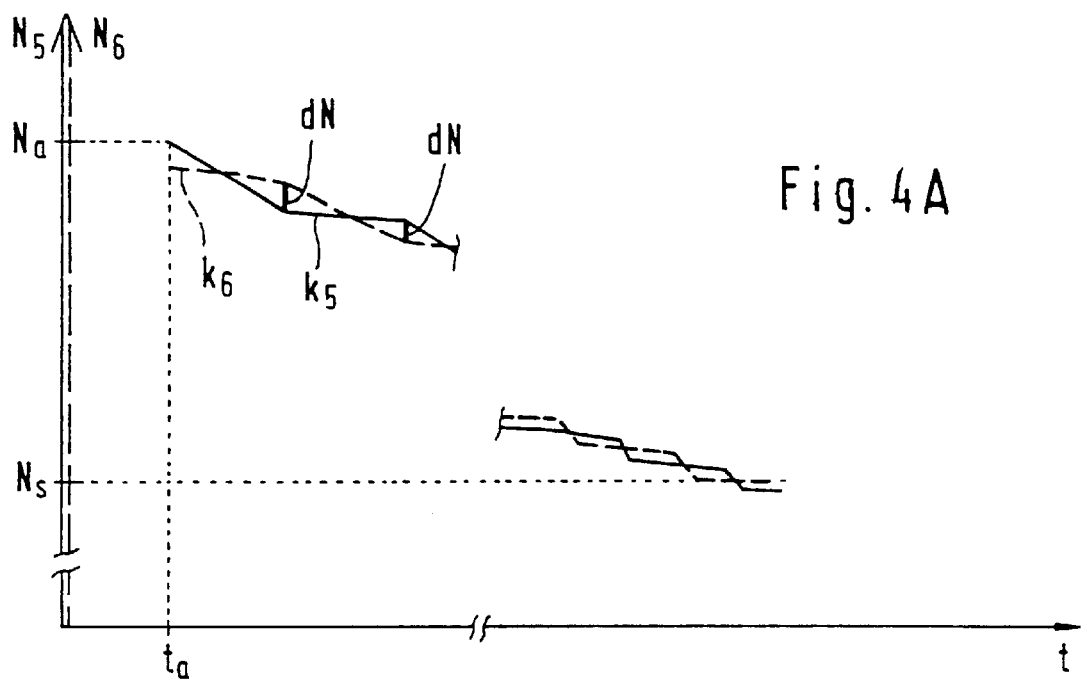
FIGS. 4A–4C show different diagrams to explain the control of a lowering of the level.
Figure 4B:
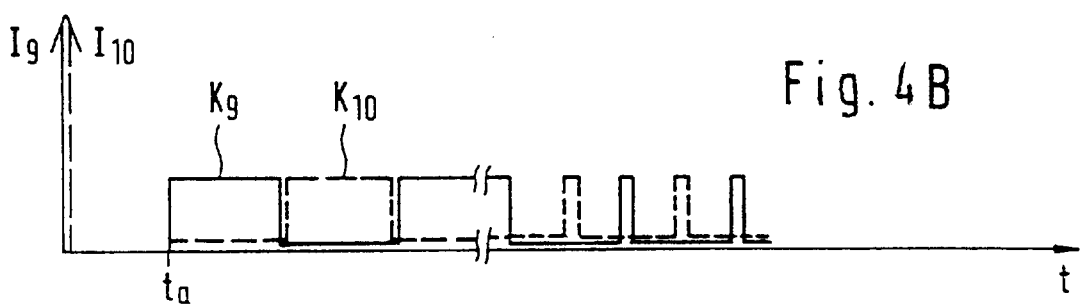
Figure 4C:
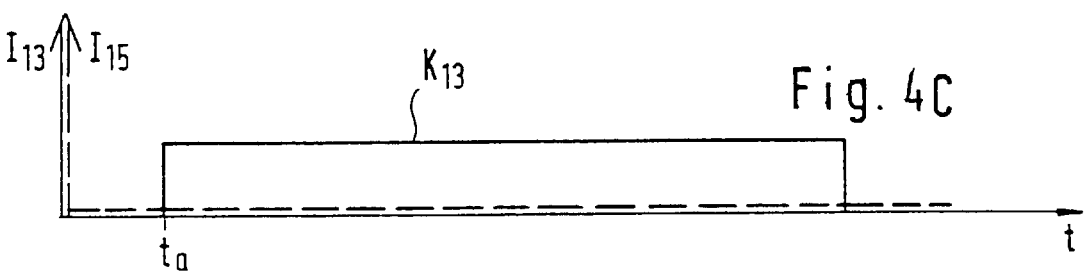

FIGS. 4A–4C show, in a representation which is analogous to FIGS. 3A–3C, a lowering of the level in the case of a stationary vehicle, the variation over time of the levels $N_5$ and $N_6$ being represented in FIGS. 4A. FIG. 4B and 4C show the energization of the actuator magnets of the valves 9, 10 and 13.

The compressor 12 and the electric motor 15 which drives it remain switched off during a lowering of the level.

It will be assumed that at a time $t_a$ at least a level $N_a$ is present on both vehicle sides, and the command to lower this level to the value $N_S$ is issued.

This has the consequence that at the time $t_a$ the outlet valve 13 is opened by energizing its actuator magnet, and one of the shut-off valves 9 and 10, the shut-off valve 9 in the example illustrated. As a result, the level $N_5$ is lowered in accordance with the curve $K_5$. At the same time, the level $N_6$ is also lowered. As soon as the level $N_5$ lies below the level $N_6$ by the small absolute value dN, the current $I_9$ for the actuator magnets of the shut-off valve 9 is switched off, i.e. the valve 9 closes. At the same time, the actuator magnet of the shut-off valve 10 is energized, i.e. the valve 10 opens. If the level $N_6$ is subsequently reduced (in which case the level $N_5$ is also in turn lowered) and lies below the level $N_5$ by the value dN, the valve 10 is shut off by switching off the current $I_{10}$ and the valve 9 is opened again etc.

As soon as one of the levels $N_5$ or $N_6$—the level $N_5$ in the present example—has reached or dropped below a value which lies above the level $N_S$ to be set by a predefined, small amount, the lowering process is slowed down by opening and closing the valves 9 and 10 in a pulsed fashion in each case. In the process, the actuator magnet of the shut-off valve 9, for example, firstly receives a current pulse after a relatively long interval so that this valve 9 briefly opens and closes. After a further interval, the valve 9 or 10 is briefly opened on the vehicle side at the higher level etc. In the process, the valves 9 and 10 are normally alternately opened, but a valve can also be repeatedly opened in succession.

This ensures that the desired level $N_S$ can be reached with high precision.

If the levels $N_5$ and $N_6$ at the start of a lowering of the level are unequal, the respectively higher level is firstly lowered until an approximate equilibrium is reached.

In the change in level which is illustrated above when the vehicle is stationary, the signals of the displacement sensors 17 are not filtered, or are filtered only in such a way that in each case short-term average values, i.e. average values for a very short time period which directly precedes the respective time, are formed.

In the case of a travelling vehicle, the signals of the displacement sensors 17 are filtered in terms of forming long-time average values, i.e. the average values relate in each case to time periods which are very long in comparison with the time period of typical vertical movements of suspension elements.

For the rest, when there is a change in the level when the vehicle is travelling, the valves 9 and 10 on the vehicle side which is to be respectively adapted in terms of level are opened—with the compressor 12 running and shut-off valve 13 closed in the case of a raising of the level and with the shut-off valve 13 opened and compressor 12 deactivated in the case of a lowering of the level—for predefined time periods (e.g. 5 sec.), i.e. the opening and closing times of the valves 9 and 10 are determined exclusively as a function of time and thus independently of the change in level which took place when the valve 9 or 10 was opened. After the respective valve 9 or 10 is closed, it is then checked whether the respectively reached level lies within a tolerance band. Otherwise, correction is carried out again. In the case of very large deviations from the tolerance band, the aforementioned time periods can be lengthened (for example to 20 sec.), this is provided, preferably in the case of a vehicle which is starting up, if the respective actual level deviates greatly from the setpoint level.

In order to avoid a sideways inclination of the vehicle body when cornering leads to undesired level corrections, there may be provision that level corrections take place only if the differences from the setpoint level are in the same direction on both vehicle sides.

However, basically, a change in level in the case of a travelling vehicle can take place in the same way as in the case of a stationary vehicle.

If appropriate, it may be desired to completely lower the vehicle, in particular when it is stationary. Here, the lowering of the level takes place firstly in the same way as has been presented above with reference to FIG. 4. As soon as one of the displacement sensors 17 signals that the associated stop 8 (cf. FIG. 2) has become active or will become active if there is a slight further lowering, both shut-off valves 9 and 10 are subsequently respectively opened simultaneously in order to permit complete venting of the pneumatic-suspension assemblies 5 and 6, as is important in particular for inspection purposes.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Axle assembly with a level control for a pneumatic suspension for a vehicle, comprising:
controllable pneumatic-suspension assemblies which are arranged separately on each vehicle side, the controllable pneumatic-suspension assemblies being connectable separately to at least one of a compressor and an outlet to atmosphere via a control valve arrangement, and sensors arranged separately for each said vehicle side for sensing at least one of a level of a vehicle body and a distance between a vehicle body part and a wheel carrier of the axle assembly, wherein a change on both of said sides in the level of the vehicle body takes place incrementally and with continuous alternation between the vehicle sides via a closed-loop or an open-loop control unit which controls the control valve arrangement to directly connect the pneumatic-suspension assembly of the one vehicle side and the pneumatic-suspension assembly of the other vehicle side to the compressor in an alternating fashion to provide successive incremental lifting movements for each of the vehicle sides in an alternating fashion, and when the level of the vehicle body is to be lowered on both of said each sides, said closed-loop or open loop control unit connects the pneumatic-suspension assemblies to the atmosphere in an alternating fashion to carry out successive incremental lowering movements for each of the vehicle sides in an alternating fashion, and wherein during the respective lifting or lowering movement of a respectively active pneumatic-suspension assembly by the control unit, the level of the vehicle body at the respective vehicle side is set to be higher or lower by a specific amount than the level of the vehicle body at a corresponding pneumatic-suspension assembly on the respective other vehicle side.

2. Axle assembly according to claim 1, wherein the control unit switches on the compressor only when there is an opened connection to one of the pneumatic-suspension assemblies.

3. Axle assembly according to claim 1, wherein the wheel carriers which are assigned to the two vehicle sides are connected to one another via a rigid axle or a coupling which is similar to a rigid axle.

4. Axle assembly according to claim 1, wherein the pneumatic-suspension assemblies are arranged at a predetermined distance from the wheel carriers in the transverse direction of the vehicle.

5. Axle assembly according to claim 1, further comprising a stabilizer which is arranged on the axle assembly.

6. Axle assembly according to claim 1, wherein command value or setpoint value signal transmitters which can be activated manually are assigned to the control unit.

7. Axle assembly according to claim 1, wherein, when the level of the vehicle body is raised when the vehicle is stationary, at least the pneumatic-suspension assembly which was last to be fed compressed air is briefly connected to the atmosphere when a desired level is reached.

8. Axle assembly according to claim 1, wherein, when the level of the vehicle body is lowered when the vehicle is stationary, the respective pneumatic-suspension assembly is connected to the atmosphere only in a pulsed fashion by alternately opening and closing a shut-off valve just before a desired level is reached.

9. Axle assembly according to claim 1, wherein when the vehicle is travelling a timed raising or lowering of the level takes place in that a pneumatic-suspension assembly is vented or ventilated for a predetermined time period and it is then checked whether the respectively reached level lies within a tolerance band, and wherein further timed corrections then take place if appropriate.

10. Axle assembly according to claim 1, wherein when the vehicle is starting to travel, a rapid change in level takes place if the difference from the desired level is large and differences in level are present in the same direction on both sides of the vehicle.

11. A method of adjusting a level of a vehicle having separately controllable left-side and right-side pneumatic-suspension assemblies and corresponding left-side and right-side vehicle level sensors, said method comprising:

sensing an actual level of the vehicle via said level sensors;

comparing the actual level of the vehicle with a desired vehicle level; and adjusting said left-side and right-side pneumatic-suspension assemblies by continuously alternating between the following steps until the actual level of the vehicle corresponds to said desired vehicle level:
 (a) adjusting one of said left-side and right-side pneumatic-suspension assemblies until a difference in the level between the left-side pneumatic-suspension assembly and the right-side pneumatic-suspension assembly is a predetermined value, and
 (b) adjusting the other of said left-side and right-side pneumatic-suspension assemblies until a difference in the level between the left-side pneumatic-suspension assembly and the right-side pneumatic-suspension assembly is said predetermined value.

12. Axle assembly with a level control for a pneumatic suspension for a vehicle, comprising:

controllable left-side and right-side pneumatic-suspension assemblies which are arranged separately on each vehicle side in relation to a longitudinal axis of the vehicle, the controllable pneumatic-suspension assemblies being connectable separately to at least one of a compressor and an outlet to atmosphere via a control valve arrangement, and sensors arranged separately on each said vehicle side for sensing at least one of a level of a vehicle body and a distance between a vehicle body part and a wheel carrier of the axle assembly, wherein a change on both of said sides in the level of the vehicle body takes place incrementally and with continuous alternation between the vehicle sides via a closed-loop or an open-loop control unit which controls the control valve arrangement to directly connect the left-side pneumatic-suspension assembly and the right-side pneumatic-suspension assembly to the compressor in an alternating fashion to provide successive incremental lifting movements for each of the vehicle sides in an alternating fashion, and when the level of the vehicle body is to be lowered on both of said each sides, said closed-loop or open loop control unit connects the left-side and the right-side pneumatic-suspension assemblies to the atmosphere in an alternating fashion to carry out successive incremental lowering movements for each of the vehicle sides in an alternating fashion and, wherein during the respective lifting or lowering movement of a respectively active pneumatic-suspension assembly by the control unit, the level of the vehicle body at the respective vehicle side is set to be higher or lower by a specific amount than the level of the vehicle body at a corresponding pneumatic-suspension assembly on the respective other vehicle side.

13. An assembly for adjusting a level of a vehicle having separately controllable left-side and right-side pneumatic-suspension assemblies and corresponding left-side and right-side vehicle level sensors comprising:

means for sensing an actual level of the vehicle via said level sensors, means for comparing the actual level of the vehicle with a desired vehicle level, and means for adjusting said left-side and right-side pneumatic-suspension assemblies by continuously alternating between the following steps until the actual level of the vehicle corresponds to said desired vehicle level:
 (a) adjusting one of said left-side and rightside pneumatic-suspension assemblies until a difference in the level between the left-side pneumatic-suspension assembly and the right-side pneumatic-suspension assembly is a predetermined value, and
 (b) adjusting the other of said left-side and right-side pneumatic-suspension assemblies until a difference in the level between the left-side pneumatic-suspension assembly and the right-side pneumatic-suspension assembly is said predetermined value.

* * * * *